March 12, 1957
W. L. AMMANN
2,784,777
TIRE BEAD UNSEATING TOOL
Filed Jan. 24, 1955
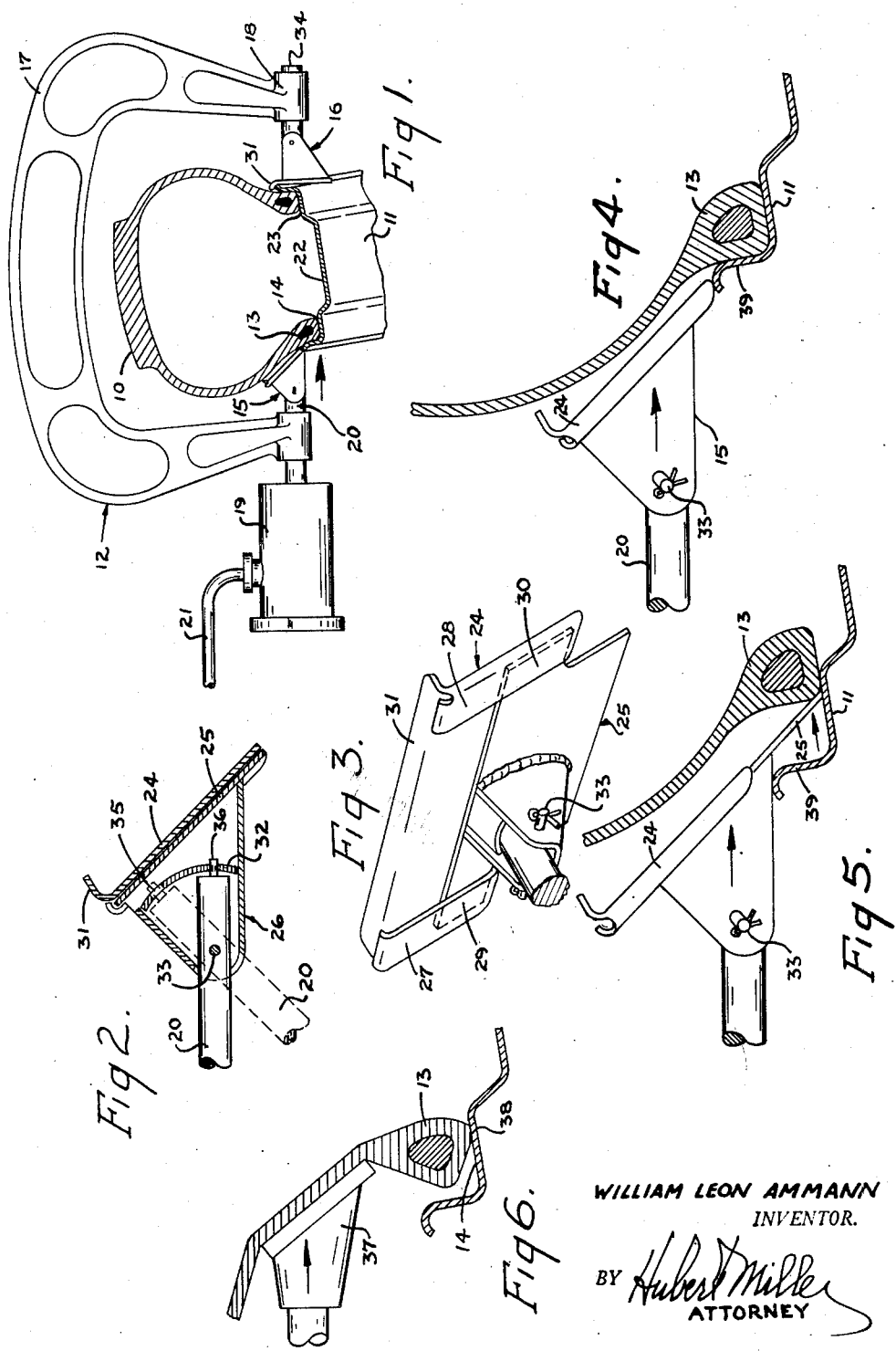
WILLIAM LEON AMMANN
INVENTOR.
BY *Hubert Miller*
ATTORNEY

United States Patent Office

2,784,777
Patented Mar. 12, 1957

2,784,777

TIRE BEAD UNSEATING TOOL

William Leon Ammann, Argonia, Kans.

Application January 24, 1955, Serial No. 483,528

4 Claims. (Cl. 157—1.26)

This invention relates to power tools which aid in removing large and heavy tractor and truck tires from their rims, and more particularly to tire bead contacting shoes which constitute a part of such tools.

One type of power tool to which the present invention is particularly adapted is a generally C-shaped pressure cylinder operated bead compressing clamp. Such a tool is clearly illustrated in Patent No. 2,577,910, issued December 11, 1951, to E. W. Oliva. Such tools normally include a fixed shoe on one leg of the C-shaped clamp, and a second shoe movable by the pressure cylinder toward the first mentioned shoe. The two shoes are placed on opposite sides of the tire adjacent the respective edges of the rim, and compressing pressure is applied by the cylinder, thus forcing the two sidewalls of the tire toward each other and toward the center of the drop center rim.

The difficulty with the above mentioned type of power tool and with other similar conventional power tools now in general use is that the pressure is applied at sidewall points spaced above the base of the bead. The applied pressure thus tends to roll the tire beads over on their inner edges on their respective rim seats. The rolling of the bead at the point of pressure application places the entire bead in tension and thus tends to very materially tighten the bead on its rim seat. This defeats the purpose of the tool, which is to force the bead laterally toward the center of the rim, which is of smaller diameter than the rim seats. It is evident that if the lateral pressure can be applied at or near the base of the tire bead no rolling moment will be created, and the bead will be slidably moved off its seat without any increase in bead tension.

It is a primary object of this invention, therefore, to provide a bead-contacting shoe which is so constructed that it is capable of applying lateral pressure to the outer surface of the base of a tire bead to slide the bead from its normal operating rim seat into the central smaller diameter portion of a conventional drop center rim, without increasing the bead tension by rolling the bead over on its side.

It is an additional important object of the invention to provide a shoe of the type mentioned which is adjustable in angular relationship with the tire sidewall and rim, and which is also capable of anchoring against the rim proper so that bead unseating pressure may be applied by the opposing shoe without simultaneous deflection of both tire sidewalls.

It is an additional object of the invention to provide a shoe of this type which includes two tire contacting parts which are slidable with relation to each other, one of which makes the initial contact and applies the initial pressure along a surface immediately adjacent the upper edge of the rim, and the other of which moves into position to contact the outer surface of the base of the bead after the tire has been moved slightly away from the outer edge of its seat on the rim.

The invention, together with other objects attending its production, will be more clearly understood when the following description is read in connection with the accompanying drawings, in which:

Figure 1 is a side elevation of a conventional power tool on which a pair of shoes made in accordance with the present invention are shown installed. The view shows a conventional tire and rim in section, and generally illustrates the operation of the shoe which constitutes the present invention;

Figure 2 is a longitudinal vertical sectional view through a shoe embodying my invention;

Figure 3 is a three-quarter rear perspective view of the shoe illustrated in Fig. 2, and shows details in construction;

Figure 4 is a side view of the shoe of this invention, and shows the initial step in its operation. A tire bead and its rim seat are shown in sections;

Figure 5 is a view similar to Figure 4, and illustrates the operation of the tool as it moves the tire bead off its rim seat;

Figure 6 is a view similar to Figs. 4 and 5, and illustrates the action of a conventional shoe as it attempts to move a tire bead off its rim seat.

Figure 2 illustrates a conventional pressure cylinder operated power tool designed for the purpose of unseating the tire beads from their respective seats on a drop-center rim. In place of the conventional pair of tire contacting shoes with which such tools are normally equipped, a pair of shoes embodying the instant invention have been substituted. The tire 10 and its rim 11 are shown in cross section. The tool, designated as a whole by the numeral 12, is shown in the proper position for unseating the tire bead 13 from its rim seat 14. The shoes are designated by the numerals 15 and 16. The tool includes a generally C-shaped frame 17, one end of which is provided with a socket 18 to facilitate attachment of the shoe 16. The other end of the frame 17 rigidly supports a pressure operated cylinder 19 which is fitted with a plunger 20 to the free end of which shoe 15 is connected. The plunger 20 is positioned to reciprocate in substantial alignment with the socket 18 at the opposite side of the frame. A fluid pressure line 21 communicates with the outer end of cylinder 19 and completes the assembly. It will be seen that as plunger 20 is forced to move toward socket 18 the shoe 15 will contact the adjacent sidewall of tire 10 and will force the tire bead 13 to move laterally toward the drop-center portion 22 of rim 11. The drop-center portion 22 of the rim is smaller in diameter than either of the rim seats 14 or 23. Further details in the operation of the tool and its pair of shoes will be explained herein in greater detail.

Generally, a tire contacting shoe embodying the present invention includes a tire sidewall contacting plate 24 (Figs. 2 and 3), a tire bead contacting plate 25 and a means in the form of a socket 26 projecting rearwardly from and connected to the rear face of the bead contacting plate to facilitate connection of the shoe to the unseating tool. The plates 24 and 25 include cooperating means for securing them together for limited relative longitudinal movement in such manner that the forward edge of the bead contacting plate 25 may move to a projected position ahead of the forward edge of the sidewall contacting plate 24, as clearly illustrated in Fig. 3.

As to details in construction, and still referring to Figs. 2 and 3 of the drawing, it will be seen that the opposite side edges of plate 24 are reversely bent to form flanges 27 and 28, which are spaced from the rear face of plate 24 by a distance slightly greater than the thickness of plate 25. The respective opposite ends of the flanges 27 and 28 are bent toward the plate 24 and into contact therewith, thus forming a pair of opposed slide ways which are closed at their respective forward and rear ends. These slideways slidably receive ears 29 and 30 (shown in broken lines in Fig. 3) which project from the opposite sides of the rear edge of plate 25. This arrangement permits limited relative longitudinal movement of the two plates, and permits the forward edge of plate 25 to move to a projected position ahead of the forward edge of the plate 24.

As shown, plate 24 is provided with an integral forwardly projecting flange 31 along its rear edge. This flange serves to anchor against the outer edge of the rim of a wheel during the bead unseating process, as illustrated by the position of the shoe 16 in Fig. 1.

As a means to facilitate connection of the entire shoe to the unseating tool, the socket 26 is rigidly secured as by welding to the rear face of plate 25. This socket is generally U-shaped in cross section, and is generally triangular in vertical section, as shown in Fig. 2. At the bottom of the socket an arcuate plate 32 (Fig. 2) is rigidly secured. The outer end of socket 26 is provided with a pair of aligned through perforations for receiving an anchoring pin 33, which pin serves to pivotally secure the entire shoe either to the cylinder plunger 20 or to a short rod 34 (Fig. 1) which is of a diameter to be snugly received within the socket 18. It will be noted that the perforations for receiving the pin 33 are elongated as clearly shown in Figs. 4 and 5 in order to permit a slight longitudinal movement of either the plunger 20 or the rod 34 within their respective sockets.

Referring to Fig. 2, it will be seen that the arcuate plate 32 is provided with a pair of spaced perforations, one of which is indicated by the numeral 35, which perforations are adapted to receive a reduced diameter coaxial projection 36 which is made integral with the outer end of the plunger 20 and the rod 34. The center of the bend radius of the arcuate plate 32 coincides with the center of pivot pin 33. Thus it is possible to move the plunger 20 outwardly slightly from socket 26 and to unseat the projection 36 from its perforation in the plate 32. This unseating permits the angle of the plunger 20 to be changed by pivotal movement about the pin 33, and thus permits the projection 36 to be seated in the other perforation in the arcuate plate 32. Such movement thus changes the angle between the plunger 20 and the rear plate 25. The two permitted positions of the plunger 20 or of the rod 34 with relation to the rest of the shoe are clearly shown in Fig. 2 by both the solid lines and the broken lines. The two permitted angular adjustments of the shoe with relation to the respective mounting rods are also shown by the shoes 15 and 16 in Fig. 1.

Operation

Fig. 6 clearly illustrates the action of a conventional shoe 37 when used in a bead unseating tool. It will be noted that the shoe contacts the bead 13 a considerable distance above its base and at a point where the tire sidewall is comparatively flexible. Travel of the shoe 37 in the direction indicated by the arrow thus rolls the bead on its seat 14. This rolling movement flattens the extreme inner edge of the bead on the seat 14 as shown at 38 in Fig. 6, and places the entire bead in extreme tension. This tension naturally tends to tighten the bead on its seat 14 and thus prevents the bead from being moved from its seat toward the drop-center portion of the rim.

Figs. 4 and 5 illustrate the action of a shoe made in accordance with present invention. In Fig. 4 the shoe 15 is shown adjusted at an acute angle with relation to the plunger 20 and is in proper position to start the bead unseating process. As the shoe moves in the direction indicated by the arrow it contacts the tire above the base of the bead 13 and adjacent the upper edge of the rim and moves that portion of the tire slightly away from the outer flange of the rim. As soon as the plate 24 clears the outer flange 39 of the rim, the plate 25 is free to move forward with relation to the plate 24. Such movement occurs immediately because plate 24 is held in frictional contact with the sidewall of the tire, and the applied force is at an angle to the surface of plate 24. Plate 25 thus moves forward into the position shown in Fig. 5. In this position its forward edge contacts the base of the bead 13 and thereafter serves to transmit the compressing force directly to the base of the bead. Application of force at this point prevents the bead from being rolled over on its side. Instead it simply slides the bead inward toward the drop-center portion 22 of the rim.

Again referring to Fig. 1 it should be noted that the shoes 15 and 16 are adjusted angularly with relation to the plunger 20 and the rod 34 so that the flange 31 of the shoe 16 contacts the outer edge of rim 11. Thus when the power tool moves the shoe 15 in the direction of the arrow only the one bead is unseated from its rim seat. However, if desired the shoe 16 may be readjusted angularly into the same position as the shoe 15, in which case its action on the opposing tire bead is identical to the action of the shoe 15 on its bead. In other words either or both beads of the tire may be unseated, depending on the desires of the operator.

It should be noted that the shoe of this invention is capable of use on most any type of power tool which is capable of moving one tire contacting shoe toward another. The cross-sectional shape of the rod 34 may be varied to conform to the cross-sectional shape of any socket 18.

Having described the invention with sufficient clarity to enable those familiar with this art to construct and use it, I claim:

1. A tire contacting shoe for a tool which is adapted to unseat the bead of a tire from its seat on the rim of a vehicle wheel comprising: a tire sidewall contact plate and a tire bead contact plate arranged flat against each other for limited relative longitudinal slidable movement, said plates having similarly disposed front and rear faces; and an elongated linear force transmitting member having its forward end rigidly secured centrally to the rear face of the bead contact plate, the long axis of said member being disposed at an acute angle with relation to the respective planes of the two plates, whereby force transmitted along the long axis of the force transmitting member tends to slide the bead contact plate forward with respect to the sidewall contact plate.

2. The shoe described in claim 1 in which the relative angle between the force transmitting member and the bead contact plate may be selectively changed and the member locked in the new relative position.

3. A tire contacting shoe for a tool which is adapted to unseat the bead of a tire from its seat on the rim of a vehicle wheel comprising: a tire sidewall contact plate; a tire bead contact plate, the two plates having similarly disposed front and rear faces and being arranged flat against each other; cooperation means on the two plates securing them together for limited relative longitudinal movement in such manner that the forward edge of the bead plate may move to a position ahead of the forward edge of the sidewall contact plate; and an elongated linear force transmitting member having its forward end rigidly secured centrally to the rear face of the bead contact plate, the long axis of said member being disposed at an acute angle with relation to the respective planes of the two plates, whereby force transmitted along the long axis of the force transmitting member tends to slide the bead contact plate forward with respect to the sidewall contact plate.

4. The shoe described in claim 3 in which the relative angle between the rear face of the bead contact plate and the force transmitting member is adjustable.

References Cited in the file of this patent

UNITED STATES PATENTS

| | | |
|---|---|---|
| 2,506,007 | Winstead | May 2, 1950 |
| 2,527,102 | Miess | Oct. 24, 1950 |
| 2,534,950 | Butterfield et al. | Dec. 19, 1950 |
| 2,582,869 | Honeycutt | Jan. 15, 1952 |